US 9,053,307 B1

(12) United States Patent
Johansson et al.

(10) Patent No.: US 9,053,307 B1
(45) Date of Patent: Jun. 9, 2015

(54) BEHAVIOR BASED IDENTITY SYSTEM

(75) Inventors: Jesper M. Johansson, Redmond, WA (US); George N. Stathakopoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 174 days.

(21) Appl. No.: 13/555,724

(22) Filed: Jul. 23, 2012

(51) Int. Cl.
   H04L 9/32          (2006.01)
   G06F 21/30         (2013.01)
   G06F 21/31         (2013.01)

(52) U.S. Cl.
   CPC .................................. G06F 21/316 (2013.01)

(58) Field of Classification Search
   CPC ....... G06F 21/316; G06F 21/31; H04L 63/08;
                                                H04L 63/083
   USPC .................... 705/14.25, 26.35, 75, 67, 14.26;
                           726/2–7, 21, 27; 713/182, 185, 168;
                                                         709/229
   See application file for complete search history.

(56) References Cited

U.S. PATENT DOCUMENTS

| | | | |
|---|---|---|---|
| 6,496,936 B1* | 12/2002 | French et al. ...................... | 726/7 |
| 7,853,984 B2* | 12/2010 | Antell et al. ....................... | 726/2 |
| 8,191,164 B2* | 5/2012 | Pepin et al. ....................... | 726/30 |
| 2002/0188854 A1 | 12/2002 | Heaven et al. | |
| 2004/0083394 A1* | 4/2004 | Brebner et al. ................ | 713/202 |
| 2007/0124290 A1* | 5/2007 | Swanson et al. .................. | 707/3 |
| 2009/0049544 A1* | 2/2009 | Kashi ............................... | 726/19 |
| 2009/0260075 A1* | 10/2009 | Gedge et al. ..................... | 726/17 |
| 2010/0036783 A1* | 2/2010 | Rodriguez ....................... | 706/15 |
| 2010/0115610 A1* | 5/2010 | Tredoux et al. .................. | 726/19 |
| 2010/0122329 A1 | 5/2010 | Jakobsson et al. | |
| 2010/0125505 A1* | 5/2010 | Puttaswamy .............. | 705/14.67 |
| 2010/0131835 A1* | 5/2010 | Kumar et al. .................. | 715/205 |
| 2010/0274597 A1* | 10/2010 | Dill .................................... | 705/7 |
| 2011/0022477 A1 | 1/2011 | Hatridge et al. | |
| 2011/0225644 A1 | 9/2011 | Pullikottil et al. | |
| 2012/0079576 A1* | 3/2012 | Han et al. .......................... | 726/7 |
| 2012/0137340 A1* | 5/2012 | Jakobsson et al. ................ | 726/1 |
| 2012/0198491 A1* | 8/2012 | O'Connell et al. ............. | 725/30 |
| 2013/0054433 A1* | 2/2013 | Giard et al. ..................... | 705/34 |
| 2013/0097673 A1* | 4/2013 | Meehan et al. ................... | 726/4 |
| 2013/0124641 A1* | 5/2013 | Ryabchun et al. ............ | 709/206 |
| 2013/0167207 A1* | 6/2013 | Davis et al. ....................... | 726/5 |
| 2014/0137223 A1* | 5/2014 | Wagner et al. .................... | 726/7 |
| 2014/0165140 A1* | 6/2014 | Singla et al. ...................... | 726/1 |

* cited by examiner

Primary Examiner — David García Cervetti
Assistant Examiner — Shanto M Abedin
(74) Attorney, Agent, or Firm — Thomas | Horstemeyer, LLP (57) ABSTRACT

Disclosed are various embodiments for a behavior-based identity system that recognizes and/or authenticates users based at least in part on stored behavioral events which have been observed previously or have been preconfigured. Multiple behavioral events expressed by a client relative to multiple resources of a network site are observed. The behavioral events correspond to data that a user has elected to share, and the user may opt-in or opt-out of the behavior-based identity system. A comparison is performed between the observed behavioral events and multiple stored behavioral events associated with a user identity. An identity confidence level as to whether the user identity belongs to a user at the client is generated based at least in part on the comparison.

25 Claims, 6 Drawing Sheets

BEHAVIOR BASED IDENTITY SYSTEM

BACKGROUND

Identity determination is often an important process for network sites. Network sites may make a determination of user identity before granting a user access to secured data or customizing content based on user preferences. Users typically verify their identity for network sites by providing a correct username and password combination.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to a behavior-based identity system. Typical systems of identity determination and authentication employ usernames and passwords. However, usernames and passwords are not infrequently compromised as the result of high profile security incidents. Further, malicious users often target passwords because of their ubiquity. Various embodiments of the present disclosure may employ user behavior demonstrated while interacting with a network site as the basis for an identity determination and authentication system. Alternatively, user behavior may be used to augment the security of existing identity determination and authentication systems. The user behavior that is observed corresponds to data that the user has elected to share, and the user may opt-in or opt-out of the behavior-based identity system.

In some embodiments, user behavior relative to a network site may be used for identity determination and authentication with that same network site. In other embodiments, user behavior relative to potentially multiple cooperating network sites may be used for identity determination and authentication to a different network site. The user behavior may be assessed server-side through requests sent to the server from a client as well as through user behavior monitored in the client and reported to the server. The user behavior may correspond to predetermined sequences of one or more behavioral events and/or automatically observed sequences of one or more behavioral events. In the following discussion, a general description of the system and its components is provided, followed by a discussion of the operation of the same.

Figure 1:
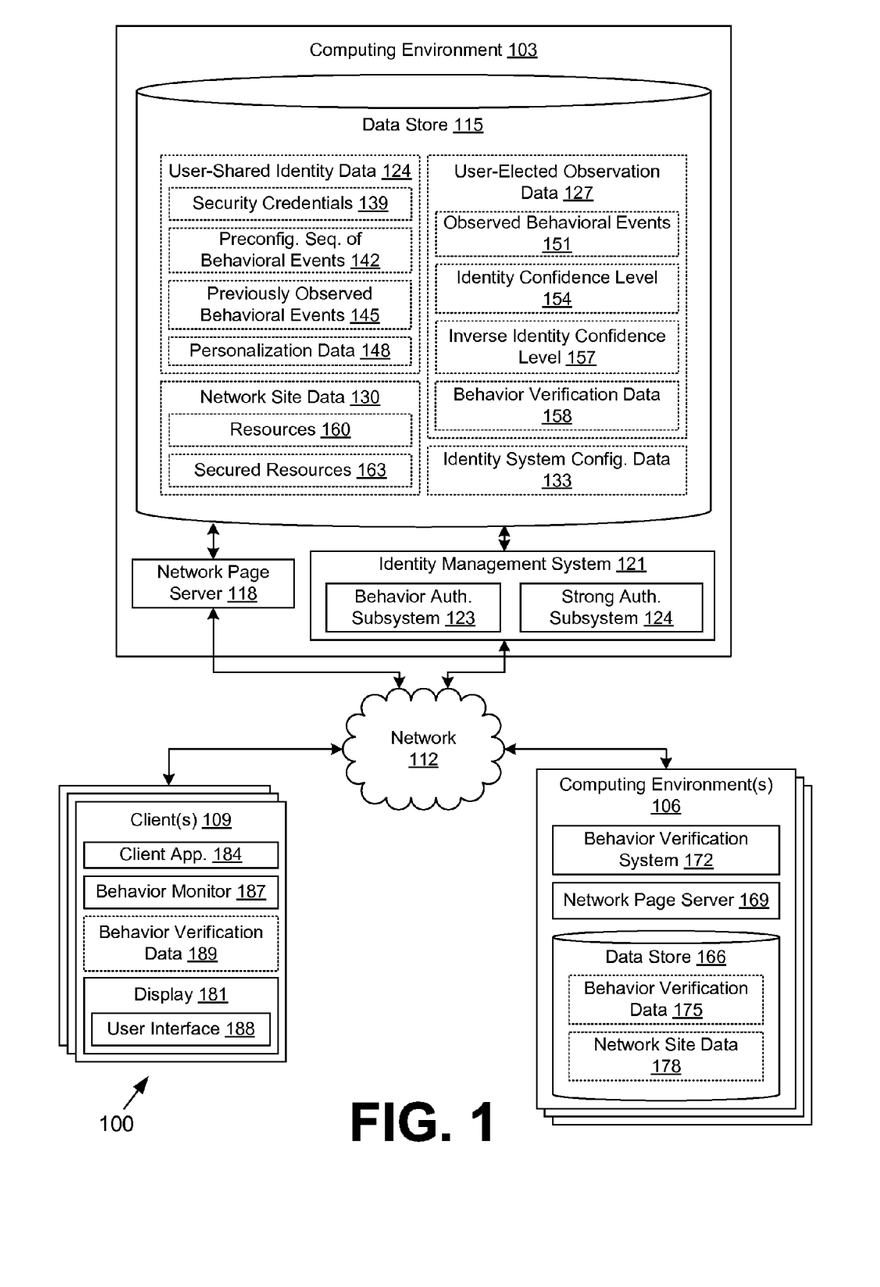
FIG. 1 is a drawing of a networked environment according to various embodiments of the present disclosure.

With reference to FIG. 1, shown is a networked environment 100 according to various embodiments. The networked environment 100 includes a computing environment 103, a computing environment 106, and a client 109 in data communication via a network 112. The network 112 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, a plurality of computing devices may be employed that are arranged, for example, in one or more server banks or computer banks or other arrangements. For example, computing environment 103 may comprise a cloud computing resource, a grid computing resource, and/or any other distributed computing arrangement. Such computing devices may be located in a single installation or may be distributed among many different geographical locations.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, include a network page server 118, an identity management system 121, and other applications, services, processes, systems, engines, or functionality not discussed in detail herein. The network page server 118 is executed to serve up various network resources of a network site. Such resources may include network page data, mobile application data, and/or other network resources. In one embodiment, the network page server 118 may correspond to a commercially available hypertext transfer protocol (HTTP) server such as Apache® HTTP Server, Apache® Tomcat®, Microsoft® Internet Information Services (IIS), and/or other servers.

The identity management system 121 is executed to provide user identity recognition and authentication functionality for the network site. The identity management system 121 may provide behavior-based identity recognition and authentication in place of, or in addition to, the use of traditional security credentials such as, for example, usernames and passwords, biometric systems, authentication based on possession of a physical token, and so on. To this end, the identity management system 121 may include a behavior authentication subsystem 123 that employs behavior-based authentication, a strong authentication subsystem 124 that employs traditional strong security credentials, and/or other subsystems.

The behavior authentication subsystem 123 of the identity management system 121 is configured to compare behavioral events generated by a client 109 purporting to have a certain user identity with stored behavioral events associated with the user identity. The behavioral events may be relative to the network site performing the identity recognition and authentication and/or to other network sites in cooperation with the network site. The stored behavioral events may be preconfigured by the authenticated user or generated automatically in response to observing the behavior of the authenticated user. The system may permit an authenticated user to opt-in or opt-out of behavior-based authentication from the behavior authentication subsystem 123 and employ strong-credential-based authentication provided by the strong authentication subsystem 124.

The data stored in the data store 115 includes, for example, user-shared identity data 124, user-elected observation data 127, network site data 130, identity system configuration data 133, and potentially other data. The user-shared identity data 124 includes various data associated with user identities and/or user accounts that have been shared by the users. In various embodiments, a user identity need not correspond to real data for a person. To the contrary, the user-shared identity data 124 may be associated with fictitious information that is provided by the user consistently. In some cases, a user identity in the user-shared identity data 124 may correspond to multiple people each having subaccounts with different behavioral characteristics. The user-shared identity data 124 may include security credentials 139, a predefined sequence of behavioral events 142, previously observed behavioral events 145, personalization data 148, and/or other data.

The security credentials 139 may include usernames, passwords, asymmetric cryptographic keys, cookie identifiers, and/or other information that may be employed for authentication that relates to data that a user has or knows rather than how the user behaves. The predefined sequence of behavioral events 142 corresponds to a sequence of behavioral events that have been preconfigured by an authenticated user for purposes of identity recognition and authentication. The behavioral events correspond to some action that is performed relative to resources of one or more network sites. Such actions may include, for example, adding a particular item to a list of items (e.g., wish list, shopping list, etc.), viewing a detail page for a particular item, executing a particular search query, accessing a particular network page, and other actions. Such actions may also include actions undertaken on social networking sites, e.g., being added to a circle of friends, adding another user to a circle of friends, and/other social network actions.

The previously observed behavioral events 145 correspond to behavioral events that have been automatically observed as being performed by an authenticated user in one or more user sessions. Such behavioral events may be associated with a time stamp or time window, as they may be regularly occurring events associated with the user identity. Such behavioral events may include recorded behaviors that are performed, and may be monitored, client side, such as typing frequency, key-press duration, frequency of scrollbar use, and/or other behavioral characteristics that may be consistent for a user. Various dimensions to the behavioral events may include categories of items purchased, locations of the client 109, and at which times of the day or times of the year a network site is accessed or a behavioral event is completed. The personalization data 148 may include settings, preferences, order history, browse history, and/or other data that may be employed by the network page server 118 in customizing or personalizing content.

The user-elected observation data 127 corresponds to data associated with a client 109 which may be unrecognized or unauthenticated as having a user identity. The user at the client 109 has elected to be observed in order to generate the user-elected observation data 127. The user-elected observation data 127 may include observed behavioral events 151, an identity confidence level 154, an inverse identity confidence level 157, behavior verification data 158, and/or other data.

The observed behavioral events 151 correspond to behavioral events that have been observed as being performed by a client 109 which is pending recognition or authentication. In some cases, the observed behavioral events 151 may include behavioral events relative to a user identity that have been performed server-side within the computing environments 103 or 106. The identity confidence level 154 is a score computed by the identity management system 121 corresponding to a confidence that a particular user identity belongs to a user at the client 109. The inverse identity confidence level 157 is a score computed by the identity management system 121 corresponding to a confidence that a user at the client 109 does not have a particular user identity (i.e., that the particular user identity does not belong to the user at the client 109).

The network site data 130 includes various data served up by the network page server 118 or used by the network page server 118 or other services in generating resource data that is served up by the network page server 118 for a network site. Such network site data 130 may include, for example, text, code, images, video, audio, and/or other data. The network site data 130 may be structured into resources 160 which are unsecured, secured resources 163, and/or other categories. For example, the resources 160 may be accessed by unrecognized or unauthenticated users, while the secured resources 163 may be accessed by users who have been recognized or authenticated.

The identity system configuration data 133 includes various configuration parameters that control the operation of the identity management system 121. Such parameters may relate to authentication and recognition thresholds, acceptable behavioral events, information regarding other cooperating network sites, and so on. The identity system configuration data 133 may also include parameters that control whether behavior of authenticated users is monitored. For example, an authenticated user may enable or disable behavior monitoring. The behavior verification data 158 may include data that verifies the performance of behavioral events relative to resources of other external network sites.

The computing environment 106 may comprise, for example, a server computer or any other system providing computing capability. Alternatively, a plurality of computing devices may be employed that are arranged, for example, in one or more server banks or computer banks or other arrangements. For example, computing environment 106 may comprise a cloud computing resource, a grid computing resource, and/or any other distributed computing arrangement. Such computing devices may be located in a single installation or may be distributed among many different geographical locations. The computing environment 106 may be operated by a different entity from the entity that operates the computing environment 103. Multiple different computing environments 106 may be provided in the networked environment 100. Such multiple computing environments 106 may each correspond to different entities and different network sites.

Various applications and/or other functionality may be executed in the computing environment 106 according to various embodiments. Also, various data is stored in a data store 166 that is accessible to the computing environment 106. The data store 166 may be representative of a plurality of data stores 166 as can be appreciated. The data stored in the data store 166, for example, is associated with the operation of the various applications and/or functional entities described below.

The components executed on the computing environment 106, for example, include a network page server 169, a behavior verification system 172, and other applications, services, processes, systems, engines, or functionality not discussed in detail herein. The network page server 169 is executed to serve up various network resources of a network site. Such resources may include network page data, mobile application data, and/or other network resources. In one embodiment, the network page server 169 may correspond to a commercially available hypertext transfer protocol (HTTP) server such as Apache® HTTP Server, Apache® Tomcat®, Microsoft® Internet Information Services (IIS), and/or other servers.

The behavior verification system 172 is configured to verify that a client 109 has performed a certain behavioral event relative to a cooperating external network site. For example, the behavior verification system 172 may verify that a certain search query has been executed in a search engine on the cooperating network site. In one embodiment, the behavior verification system 172 may store encrypted verification data in the client 109 as a cookie or other client-side data. To this end, one may regard the encrypted verification data as a "passport" which is "stamped" by the behavior verification system 172.

The data stored in the data store 166 includes, for example, behavior verification data 175, network site data 178, and potentially other data. The behavior verification data 175 corresponds to verification data generated by the behavior verification system 172. The network site data 178 includes various data served up by the network page server 169 or used by the network page server 169 or other services in generating resource data that is served up by the network page server 169 for a network site. Such network site data 178 may include, for example, text, code, images, video, audio, and/or other data.

The client 109 is representative of a plurality of client devices that may be coupled to the network 112. The client 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 109 may include a display 181. The display 181 may comprise, for example, one or more devices such as liquid crystal display (LCD) screens, gas plasma-based flat panel displays, LCD projectors, or other types of display devices, etc.

The client 109 may be configured to execute various applications such as a client application 184, a behavior monitor 187, and/or other applications. The client application 184 may correspond to a browser, mobile application, or other application configured to access and render network content, such as network pages or mobile application data, obtained from the network page servers 118 and/or 169. The client application 184 may be configured to render a user interface 188 on the display 181. The client application 184 may be configured to store behavior verification data 189 obtained from the behavior verification system 172. The client application 184 may be configured to provide the behavior verification data 189 stored in the client 109 to the identity management system 121 to facilitate identity recognition and authentication.

The behavior monitor 187 is configured to monitor client-side user behavioral events, such as typing frequency, frequency of scrollbar use, key-press duration, and so on. The behavior monitor 187 may record the resulting behavioral events in the behavior verification data 189, which may be reported to the identity management system 121. The client 109 may be configured to execute applications beyond the client application 184 or the behavior monitor 187 such as, for example, mobile applications, email applications, instant message applications, social networking applications, and/or other applications.

Next, a general description of the operation of the various components of the networked environment 100 is provided. To begin, a user establishes a user identity with the identity management system 121. The user may create various security credentials 139 such as usernames, passwords, etc. In one embodiment, a user may preconfigure a sequence of behavioral events that are to be used for authentication or recognition. Such a sequence may or may not have an ordering. Such a sequence may then be stored in the preconfigured sequence of behavioral events 142.

Figure 2:
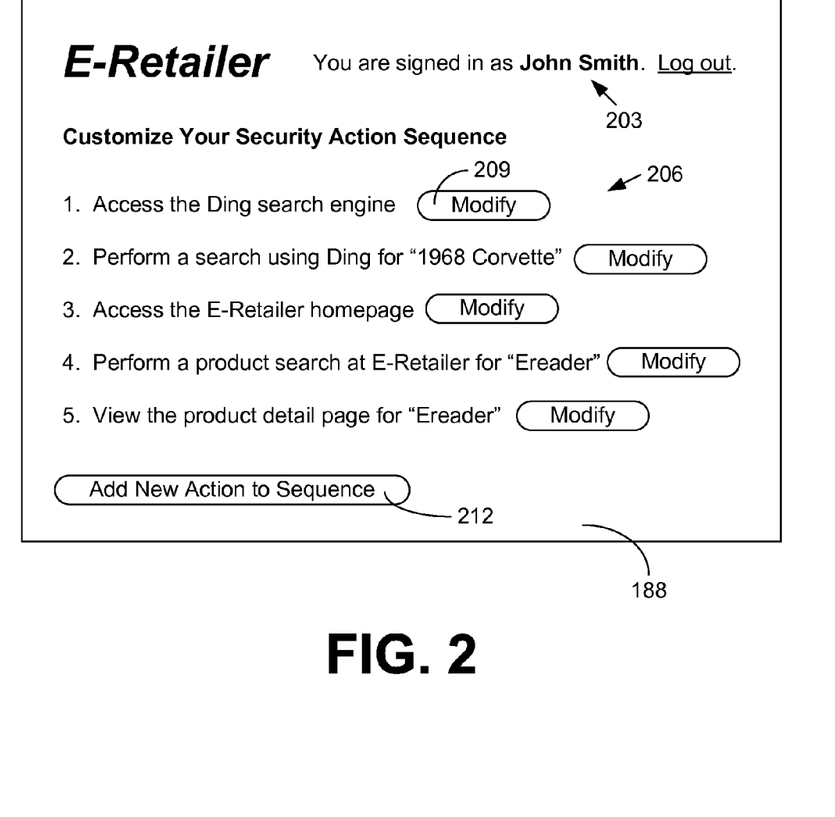
FIG. 2 is a drawing of an example of a user interface rendered by a client in the networked environment of FIG. 1 according to various embodiments of the present disclosure.

Turning briefly to FIG. 2, provided is one example of a user interface 188 rendered by a client application 184 (FIG. 1) executed in a client 109 (FIG. 1) in the networked environment 100 (FIG. 1) according to various embodiments. In this non-limiting example, the user interface 188 pertains to preconfiguring a sequence of behavioral events. The user interface 188 indicates at heading 203 that a user named "John Smith" is authenticated. "John Smith" may be the real name of the user, or a pseudonym that is consistently provided by the user. An option to log out may also be provided.

A listing 206 of behavioral events shows that five behavioral events are currently preconfigured. The first behavioral event is described as "access the Ding search engine," which may correspond to the user at the client 109 accessing a network page server 169 (FIG. 1) hosting the "Ding" search engine. The second behavioral event is described as "perform a search using Ding for '1968 Corvette.'" The third behavioral event is described as "access the E-Retailer homepage," which may correspond to the user at the client 109 accessing the network page server 118 (FIG. 1). The fourth behavioral event is described as "perform a product search at E-Retailer for 'Ereader.'" The fifth and final behavioral event is described as "view the product detail page for 'Ereader.'"

Each of the behavioral events is accompanied by a user interface component 209 for modifying or deleting the respective behavioral event. Although five behavioral events are shown in FIG. 2, it is understood that any number of behavioral events may be employed as a preconfigured sequence of behavioral events 142 (FIG. 1). To this end, the user interface 188 includes a user interface component 212 for adding a new action to the provided sequence. Other components and interfaces may be employed in other embodiments.

Returning now to FIG. 1, in another embodiment, the authenticated user simply engages in various behaviors, thereby generating behavioral events. Such behavioral events may be automatically monitored and recorded by the identity management system 121 as previously observed behavioral events 145. Such monitoring may be enabled or disabled by a tracking permission set by the authenticated user. In some cases, the monitoring is always performed. The monitoring may be performed on multiple network sites, including those hosted by network page servers 169, which cooperate with the identity management system 121. The previously observed behavioral events 145 may be associated with timestamps at which they were generated. In some cases, identity management system 121 may be configured to aggregate multiple behavioral events such that the previously observed behavioral events 145 represent typical or frequently occurring behavior expressed by a user at the client 109 relative to resources of network sites.

Later, when a user desires to be recognized or authenticated at a network site using an identity provided by the identity management system 121, the user may be recognized or authenticated based at least in part on behavior. The terms "recognized" and "authenticated" may refer to various levels of identity confidence. For example, personalizations may be applied to network resources accessed by a recognized user, but it may be that an authenticated user, but not a recognized user, has access to add a credit card to an account. Many different levels of identity confidence may be employed in various embodiments to control access to secured resources 163.

The identity management system 121 is configured to compare stored behavioral events associated with a user identity with behavioral events expressed by a user who is asserting to have that user identity. Based at least in part on that comparison, the identity management system 121 generates an identity confidence level corresponding to whether the user identity belongs to a user at the client 109, and potentially, an inverse identity confidence level corresponding to whether the user identity does not belong to a user at the client 109. The user may be unrecognized, recognized, authenticated, etc. according to corresponding thresholds for the identity confidence level and the inverse identity confidence level.

Figure 3A:
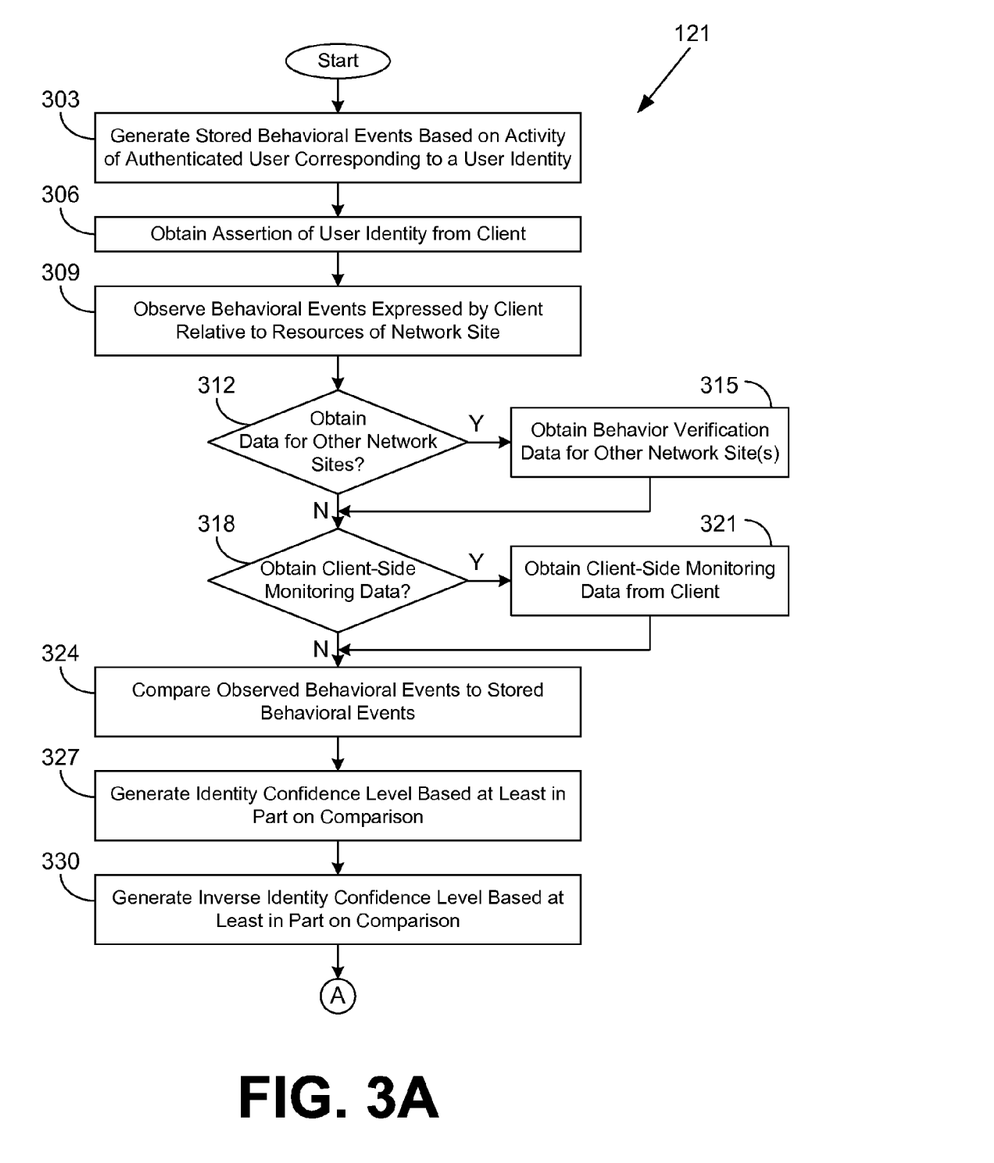
FIGS. 3A and 3B show a flowchart illustrating one example of functionality implemented as portions of an identity management system executed in a computing environment of FIG. 1 according to various embodiments of the present disclosure.
Figure 3B:
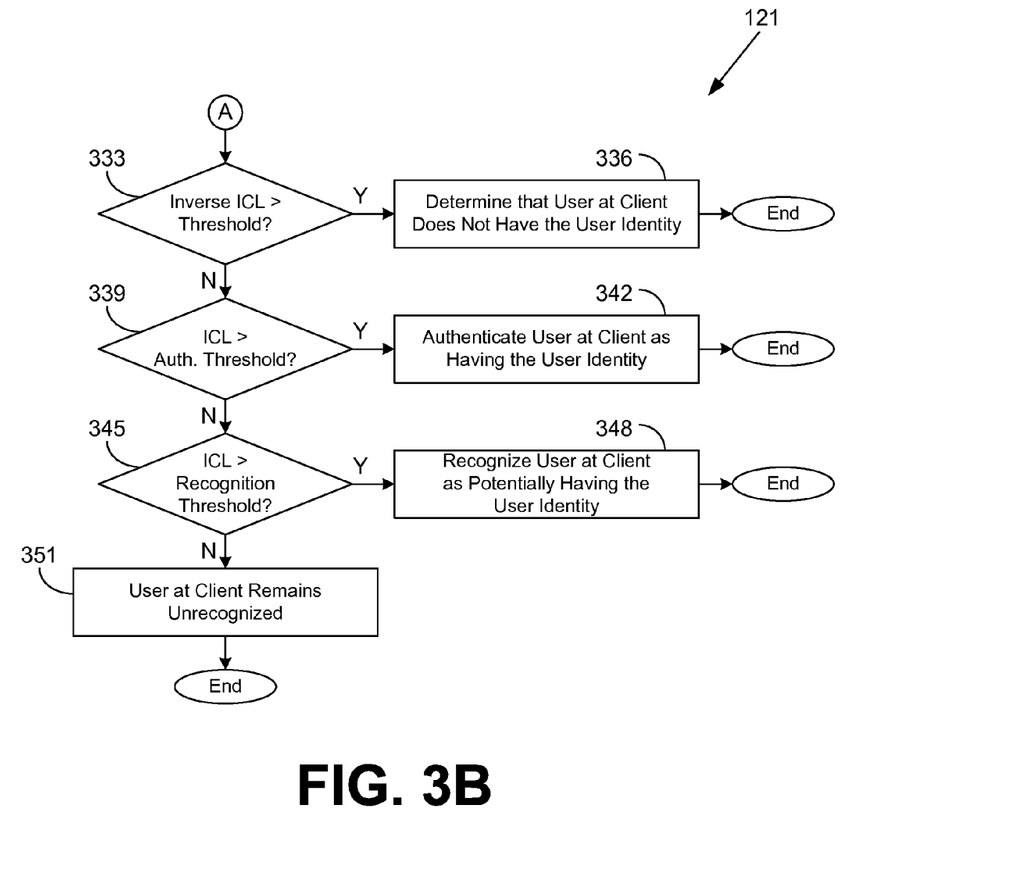

Referring next to FIGS. 3A and 3B, shown is a flowchart that provides one example of the operation of a portion of the identity management system 121 according to various embodiments. It is understood that the flowchart of FIGS. 3A and 3B provides merely an example of the many different types of functional arrangements that may be employed to implement the operation of the portion of the identity management system 121 as described herein. As an alternative, the flowchart of FIGS. 3A and 3B may be viewed as depicting an example of steps of a method implemented in the computing environment 103 (FIG. 1) according to one or more embodiments.

Beginning with box 303 in FIG. 3A, the identity management system 121 generates stored behavioral events based at least in part on activity of an authenticated user corresponding to a user identity. The stored behavioral events may correspond to the preconfigured sequence of behavioral events 142 (FIG. 1), the previously observed behavioral events 145 (FIG. 1), and/or other stored behavioral events. In box 306, the identity management system 121 obtains an assertion of user identity from the client 109 (FIG. 1). The assertion of user identity may correspond to a username and password or other type of security credential 139 (FIG. 1). In one embodiment, the assertion may correspond to data stored in a cookie on the client 109. In another embodiment, the assertion may correspond to data submitted as a form submission by the client 109. In yet another embodiment, the assertion may be provided through a uniform resource locator (URL) accessed by the client 109.

In some scenarios, an assertion of a user identity is not provided by the client 109. In such embodiments, the identity management system 121 may infer a user identity based at least in part on a resource 160 (FIG. 1) or secured resource 163 (FIG. 1) accessed or attempted to be accessed by the client 109 and/or other forms of behavior that may correlate to a user identity.

In box 309, the identity management system 121 observes behavioral events expressed by the client 109 relative to one or more resources of a network site. In box 312, the identity management system 121 determines whether to obtain data for other network sites to verify whether the client 109 has expressed behavioral events relative to resources of other network sites. If the identity management system 121 is to obtain data for other network sites, the identity management system 121 obtains behavior verification data 175 (FIG. 1) for other network sites in box 315. Such data may be obtained from the behavior verification data 189 (FIG. 1) generated by the behavior verification system 172 (FIG. 1) and stored in the client 109. Alternatively, the identity management system 121 may be configured to obtain the behavior verification data 175 from the behavior verification system 172 directly. The identity management system 121 then proceeds to box 318. If the identity management system 121 is not to obtain data for other network sites, the identity management system 121 proceeds from box 312 to box 318.

In box 318, the identity management system 121 determines whether to obtain client-side monitoring data from the client 109. If the identity management system 121 is to obtain such data, the identity management system 121 moves to box 321 and obtains client-side monitoring data generated by the behavior monitor 187 (FIG. 1) from the client 109. The identity management system 121 proceeds to box 324. If the identity management system 121 does not obtain client-side monitoring data from the client 109, the identity management system 121 moves from box 318 to box 324.

In box 324, the identity management system 121 compares the observed behavioral events to the stored behavioral events. In box 327, the identity management system 121 generates an identity confidence level 154 (FIG. 1) based at least in part on the comparison. For example, if the observed behavior includes all of the stored behavioral events with appropriate time and in the correct order, a relatively high identity confidence level 154 may be generated. By contrast, if the observed behavior contains a limited correlation to the stored behavioral events, a lesser identity confidence level 154 may be generated. Further, if very little to no correlation exists between the observed behavior and the stored behavior, a minimal identity confidence level 154 may be generated. In some cases, the identity confidence level 154 may be generated based at least in part on whether the user has provided a correct password or security credential 139. For example, a correct password or security credential 139 may be a threshold issue before behavior is evaluated.

In box 330, the identity management system 121 generates an inverse identity confidence level 157 (FIG. 1) based at least in part on the comparison. For example, if the observed behavior contains behavior that is the opposite of the stored behavioral events, a relatively high inverse identity confidence level 157 may be generated. The comparison of the behavior may include a comparison of the location of the behavior. For example, if the stored behavioral events indicate that the user has always logged in via a network address in the United States previously, and suddenly the observed behavior indicates that the user has logged in via a network address in China, a relatively high inverse identity confidence level 157 may be generated.

In box 333 of FIG. 3B, the identity management system 121 determines whether the inverse identity confidence level 157 meets a threshold. If so, in box 336, the identity management system 121 determines that a user at the client 109 does not have the user identity. Thereafter, the portion of the identity management system 121 ends. If the inverse identity confidence level 157 does not meet the threshold, the identity management system 121 moves from box 333 to box 339.

In box 339, the identity management system 121 determines whether the identity confidence level 154 meets an authentication threshold. If the identity management system 121 determines that the identity confidence level 154 meets the authentication threshold, the identity management system 121 moves to box 342 and authenticates the user at the client 109 as having the user identity. Thereafter, the portion of the identity management system 121 ends. If the identity confidence level 154 does not meet the authentication threshold, the identity management system 121 moves from box 339 to box 345.

In box 345, the identity management system 121 determines whether the identity confidence level 154 meets an intermediate threshold. If the identity management system 121 determines that the identity confidence level 154 meets the intermediate threshold for recognition, the identity management system 121 moves to box 348 and recognizes the user at the client 109 as potentially having the user identity. Thereafter, the portion of the identity management system 121 ends. If the identity confidence level 154 does not meet the authentication threshold, the identity management system 121 moves from box 345 to box 351.

In box 351, the identity management system 121 determines that the user at the client 109 remains unrecognized. The user may be recognized at a later time pending additional observed behavior increases the identity confidence level 154. Thereafter, the portion of the identity management system 121 ends.

Figure 4:
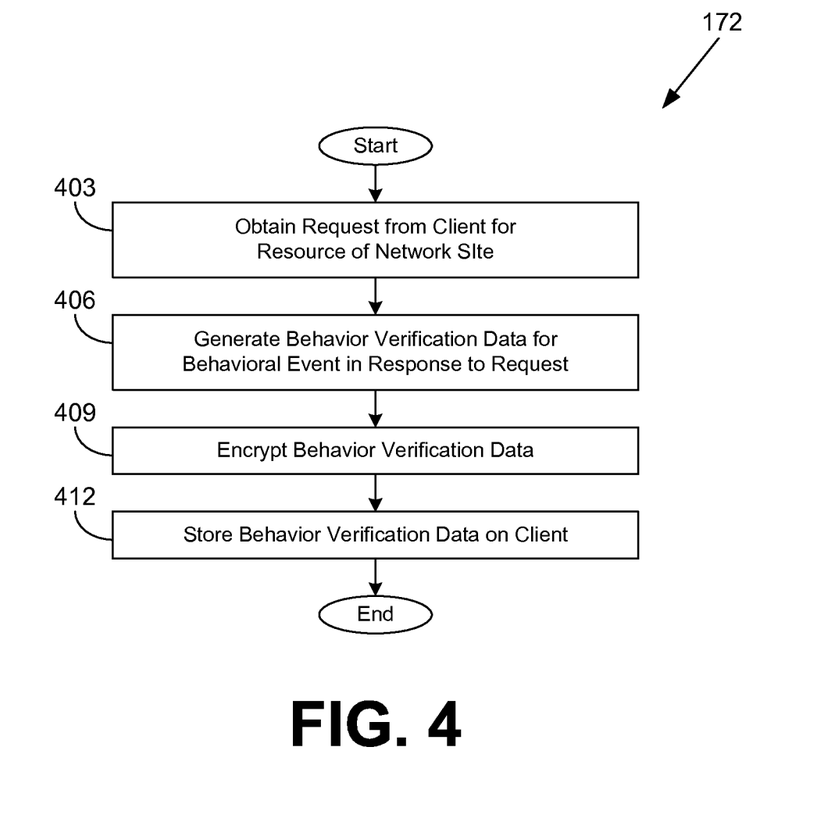
FIG. 4 is a flowchart illustrating one example of functionality implemented as portions of a behavior verification system executed in a computing environment of FIG. 1 according to various embodiments of the present disclosure.

Turning now to FIG. 4, shown is a flowchart that provides one example of the operation of a portion of the behavior verification system 172 according to various embodiments. It is understood that the flowchart of FIG. 4 provides merely an example of the many different types of functional arrangements that may be employed to implement the operation of the portion of the behavior verification system 172 as described herein. As an alternative, the flowchart of FIG. 4 may be viewed as depicting an example of steps of a method implemented in the computing environment 106 (FIG. 1) according to one or more embodiments.

Beginning with box 403, the behavior verification system 172 obtains a request from the client 109 (FIG. 1) for a resource of a network site associated with the behavior verification system 172. In box 406, the behavior verification system 172 generates behavior verification data 175 (FIG. 1) for a behavioral event in response to the request. In box 409, the behavior verification system 172 encrypts the behavior verification data 175. In box 412, the behavior verification system 172 sends the behavior verification data 175 to the client 109. In a sense, the behavior verification system 172 "stamps" a "passport" held by the client 109. In some embodiments, the behavior verification data 175 may be transferred to multiple clients 109 of the authenticated user to assist identity recognition and authentication when the user employs different clients 109. Thereafter, the portion of the behavior verification system 172 ends.

Figure 5:
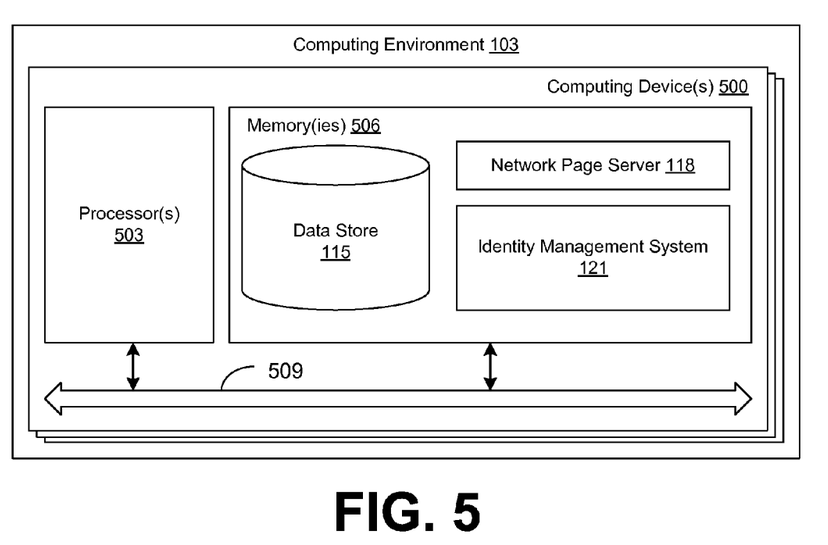
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 500. The computing device 500 includes at least one processor circuit, for example, having a processor 503 and a memory 506, both of which are coupled to a local interface 509. To this end, the computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the network page server 118, the identity management system 121, and potentially other applications. Also stored in the memory 506 may be a data store 115 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the network page server 118, the identity management system 121, the network page server 169 (FIG. 1), the behavior verification system 172 (FIG. 1), the client application 184 (FIG. 1), the behavior monitor 187 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3A-4 show the functionality and operation of an implementation of portions of the identity management system 121 and the behavior verification system 172. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3A-4 show a specific order of execution, it is understood that the order of execution may differ from that which is depicted. For example, the order of execution of two or more blocks may be scrambled relative to the order shown. Also, two or more blocks shown in succession in FIGS. 3A-4 may be executed concurrently or with partial concurrence. Further, in some embodiments, one or more of the blocks shown in FIGS. 3A-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page server 118, the identity management system 121, the network page server 169, the behavior verification system 172, the client application 184, and the behavior monitor 187, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying an identity management program executable in a computing device, comprising:
   code that stores, in a memory, a preconfigured sequence of behavioral events specified by an authenticated user in association with a user identity;
   code that, in response to receiving an assertion of the user identity from a client and receiving behavior verification data created by a server associated with a first network site, performs a comparison between a plurality of behavioral events and the preconfigured sequence of behavioral events associated with the user identity, the behavior verification data recording the plurality of behavioral events expressed by the client relative to a resource of the first network site, the plurality of behavioral events corresponding to at least one of: a client-side behavior relative to a rendered resource obtained from the first network site, a particular search query being executed in the first network site, a particular item being purchased in the first network site, or a particular resource being accessed;
   code that generates an identity confidence level as to whether the user identity belongs to a user at the client based at least in part on the comparison; and
   code that authenticates the user at the client to access a secured resource of a second network site in response to determining that the identity confidence level meets a threshold.

2. The non-transitory computer-readable medium of claim 1, wherein the server comprises a first server, the plurality of behavioral events comprises a first plurality of behavioral events, and the comparison comprises a first comparison, and further comprising:
   code that, in response to receiving behavior verification data created by a second server associated with a third network site, performs a second comparison between a second plurality of behavioral events and the preconfigured sequence of behavioral events associated with the user identity, the behavior verification data created by the second server recording the second plurality of behavioral events expressed by the client relative to a resource of the third network site; and
   wherein the code that generates the identity confidence level is further configured to generate the identity confidence level based at least in part on the second comparison.

3. The non-transitory computer-readable medium of claim 1, wherein the behavior verification data is obtained from the server.

4. The non-transitory computer-readable medium of claim 1, wherein the behavior verification data is obtained from the client.

5. The non-transitory computer-readable medium of claim 1, wherein the assertion of the user identity includes a correct password for the user identity.

6. A system, comprising:
    at least one computing device comprising a processor and a memory; and
    an identity management system executable in the at least one computing device, the identity management system comprising:
        logic that, in response to receiving a user specification of a preconfigured sequence of behavioral events, stores the preconfigured sequence of behavioral events in a memory in association with a user identity;
        logic that observes a plurality of behavioral events expressed by a client relative to a plurality of resources of a network site;
        logic that performs a comparison between the plurality of behavioral events and the preconfigured sequence of behavioral events associated with the user identity;
        logic that generates an identity confidence level as to whether the user identity belongs to a user at the client based at least in part on the comparison; and
        logic that authenticates the user at the client as having the user identity in response to determining that the identity confidence level meets a threshold.

7. The system of claim 6, wherein the identity management system further comprises:
    logic that tracks authenticated user behavior in a plurality of authenticated user sessions associated with the user identity to generate at least one of the preconfigured sequence of behavioral events; and
    wherein the logic that tracks authenticated user behavior is configured to track the authenticated user behavior when a tracking permission is enabled by an authenticated user having the user identity.

8. The system of claim 6, wherein the comparison between the plurality of behavioral events and the preconfigured sequence of behavioral events is performed in response to receiving an assertion of the user identity from the client.

9. The system of claim 8, wherein the assertion of the user identity includes a correct security credential for the user identity.

10. The system of claim 8, wherein the assertion of the user identity is obtained from a cookie stored by the client, from a form submission by the client, or from a uniform resource locator (URL) accessed by the client.

11. The system of claim 6, wherein the identity management system further comprises logic that determines an inverse identity confidence level as to whether the user identity does not belong to the user at the client based at least in part on the comparison.

12. The system of claim 6, wherein the plurality of behavioral events includes a client-side behavioral event relative to a rendered resource of the network site, and the logic that observes is configured to obtain the client-side behavioral event from monitoring code executed in the client.

13. The system of claim 12, wherein the client-side behavioral event corresponds to a typing characteristic of the user or a scrolling characteristic of the user.

14. The system of claim 6, wherein one of the behavioral events corresponds to executing a search with a particular search query on the network site.

15. The system of claim 6, wherein one of the behavioral events corresponds to accessing a particular network page on the network site.

16. The system of claim 6, wherein one of the behavioral events corresponds to adding a particular item to a list of items.

17. The system of claim 6, wherein the preconfigured sequence of behavioral events is specified by an authenticated user having the user identity.

18. The system of claim 6, wherein the plurality of behavioral events are expressed by the client relative to the resources of a plurality of network sites, and the logic that observes is configured to obtain behavior verification data created by a server associated with one of the network sites.

19. The system of claim 6, wherein the logic that performs the comparison is configured to determine whether the plurality of behavioral events match a specific sequence of the preconfigured sequence of behavioral events.

20. The system of claim 6, wherein the identity management system further comprises logic that recognizes the user at the client as potentially having the user identity in response to determining that the identity confidence level meets an intermediate threshold which is lesser than the threshold.

21. A method implemented by an identity management system, the method comprising:
    receiving, via at least one of one or more computing devices comprising a processor and memory, an assertion of a user identity from a client;
    determining, via at least one of the one or more computing devices, a stored sequence of resources associated with the user identity, the stored sequence of resources being preconfigured by an authenticated user corresponding to the user identity;
    monitoring, via at least one of the one or more computing devices, a sequence of resources accessed by the client from a network site;
    performing, via at least one of the one or more computing devices, a comparison of the sequence of resources accessed by the client and the stored sequence of resources;
    generating, via at least one of the one or more computing devices, an identity confidence level as to whether the user identity belongs to a user at the client based at least in part on the comparison; and
    authenticating, via at least one of the one or more computing devices, the user at the client as having the user identity in response to determining that the identity confidence level meets a threshold.

22. The method of claim 21, further comprising determining, via at least one of the one or more computing devices, an inverse identity confidence level as to whether the user identity does not belong to the user at the client based at least in part on the comparison.

23. The method of claim 21, wherein the sequence of resources includes adding a particular item to a shopping list or a wish list on the network site.

24. The method of claim 21, wherein the sequence of resources includes accessing a particular network page from the network site.

25. The method of claim 21, further comprising granting, via at least one of the one or more computing devices, access to a secured resource in response to determining that the identity confidence level meets the threshold.

* * * * *